US006315802B1

(12) United States Patent
Malone

(10) Patent No.: US 6,315,802 B1
(45) Date of Patent: Nov. 13, 2001

(54) H₂S PRODUCTION FROM A MOLTEN METAL REACTOR

(75) Inventor: Donald P. Malone, Grayson, KY (US)

(73) Assignee: Marathon Ashland Petroleum LLC, Findlay, OH (US)

( * ) Notice: Subject to any disclaimer, the term of this patent is extended or adjusted under 35 U.S.C. 154(b) by 0 days.

(21) Appl. No.: 09/308,523

(22) PCT Filed: Nov. 25, 1996

(86) PCT No.: PCT/US96/19112

§ 371 Date: May 18, 1999

§ 102(e) Date: May 18, 1999

(87) PCT Pub. No.: WO98/23708

PCT Pub. Date: Jun. 4, 1998

Related U.S. Application Data

(63) Continuation-in-part of application No. 08/421,102, filed on Apr. 13, 1995, now Pat. No. 5,577,346.

(51) Int. Cl.⁷ ........................................ C10J 3/06
(52) U.S. Cl. ..................... 48/197 R; 48/92; 48/198.2; 423/563
(58) Field of Search ..................... 48/92, 197 R, 48/198.2; 75/10.41, 501, 503, 506, 516, 557; 423/563

(56) References Cited

U.S. PATENT DOCUMENTS

| | | | |
|---|---|---|---|
| 1,803,221 | * 4/1931 | Tyrer | 423/650 |
| 3,895,784 | * 7/1975 | Kolb et al. | 266/81 |
| 3,959,972 | * 6/1976 | Rudloph et al. | 60/651 |
| 4,187,672 | 2/1980 | Rasor | 60/39.12 |
| 4,338,096 | 7/1982 | Mayes | 436/55 |
| 4,392,886 | * 7/1983 | Kodaka et al. | 75/539 |
| 4,574,714 | 3/1986 | Bach et al. | 588/201 |
| 4,602,574 | * 7/1986 | Bach et al. | 588/201 |
| 5,435,814 | * 7/1995 | Miller et al. | 48/92 |

FOREIGN PATENT DOCUMENTS

| | | | |
|---|---|---|---|
| 1187782 | * 4/1970 | (GB) | . |
| 2189504 A | * 10/1987 | (GB) | . |

* cited by examiner

Primary Examiner—Hien Tran
(74) Attorney, Agent, or Firm—Richard D. Stone

(57) ABSTRACT

Hydrogen sulfide is produced by charging a sulfur containing feed to a molten metal bath containing over 3 wt. % dissolved carbon. Allowing dissolved carbon levels to build up in the bath, preferably by controlling oxygen addition to ensure a large inventory of dissolved carbon, creates a reducing "atmosphere" in the molten metal bath which allows most of the feed sulfur to be converted to $H_2S$, which can be converted to elemental sulfur using a Claus unit or similar technology. Oxygen addition, to burn carbon from the bath, preferably occurs at a different time or place in the bath than the time or place of sulfur containing feed addition.

11 Claims, No Drawings

H₂S PRODUCTION FROM A MOLTEN METAL REACTOR

CROSS REFERENCE TO RELATED APPLICATIONS

This application is a continuation-in-part of prior application U.S. Ser. No. 08/421,102, filed Apr. 13, 1995, now U.S. Pat. No. 5,577,346 granted Nov. 26, 1996.

BACKGROUND OF THE INVENTION

I. Field of the Invention

This invention relates to gasification of sulfur and hydrocarbon containing streams in molten metal.

II. Description of the Prior Art

Molten metal, especially molten iron, baths are well known and widely used as gasifiers. The light temperatures in such baths rapidly decompose, by thermal action, a variety of solid, liquid and gaseous feeds into hydrogen and/or carbon oxides. Such processes are well known, e.g., U.S. Pat. Nos. 4,574,714 and 4,602,574 to Bach teach a molten iron gasifier. Another, and preferred, molten metal reactor is disclosed in U.S. Pat. No. 5,435,814, MOLTEN METAL DECOMPOSITION APPARATUS, Charles B. Miller and Donald P. Malone.

One of the problems of molten metal processing is that the feeds to such processes are rarely pure materials. If the feed were a pure hydrocarbon, such as methane with no significant amount of chlorides, trash metals, sulfur or other impurities, design and operation of the molten metal reactor is simple. Consider the case of methane conversion. The reactor need only be designed to thermally convert the $CH_4$ into hydrogen (which is thermally stable and rapidly released as pure hydrogen gas) and carbon (which rapidly dissolves in the molten iron). There are no feed impurities and no slag forms.

Once the refiner has to depart from such ideal fuels as methane, design of the reactor becomes complicated. Molten metal reactors are best at converting difficult streams not otherwise amenable to processing—resids, ground up tires, old pesticides and the like. Such materials present many challenges to the engineer charged with converting them to useful products (or at least making the offending material go away), but for now the focus is on one pervasive impurity—sulfur. The problem of sulfur in the feed is pervasive in refinery processing, coal combustion and molten metal processing. It is instructive to review how each of these processes has dealt with feed sulfur.

Crude oil invariably contains sulfur. Sulfur is so pervasive in crude oil that its presence in greater or lessor amounts makes crude oil sour or sweet. Refiners have evolved efficient ways to convert sulfur in feed into solid sulfur product. Sulfur is a valuable product in its elemental form. In refineries, the crude is generally catalytically hydrotreated to convert sulfur compounds to $H_2S$ which is eventually converted in a Claus unit to elemental sulfur. The processing is expensive, both in terms of operating and capital expense required to hydrotreat feeds, but essential.

In coal processing, sulfur is generally dealt with by stack gas scrubbing or by burning the coal in a bed of ground up limestone or dolomite. It is possible to burn coal in California if a Circulating Fluidized Bed (CFB) coal combustor is used. Relatively small amounts of coal are added to a much larger circulating inventory of crushed alkaline material. The sulfur components in the coal are oxidized to form sulfur oxides, which then react with tons of circulating, high temperature, ground dolomite.

In molten metal processing (and to some extent in steel making), sulfur is oxidized during processing to form sulfur oxides. Tie produced sulfur oxides then react with alkaline material added to the bath to form a slag layer. One example of this approach is a vitreous layer used above a molten metal bath, as taught in U.S. Pat. No. 5,354,940. A typical vitreous layer was five inches of 40% calcium oxide, 40% silicone dioxide and 20% aluminum oxide.

Although it has been known for years that it is possible to release some $H_2S$ from a molten iron bath no one has made any productive use of this finding. In UK 1,187,782, Nixon taught that a molten metal conversion process converting methane to hydrogen would also refine the iron bath:

The hydrogen produced in the cracking zone has a refining effect on the metal contained in the molten metal bath in contact with it. For instance, the sulphur content of the molten iron tends to be reduced as a result of the reaction:

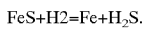
$FeS+H2=Fe+H_2S.$

The EXAMPLE in the Nixon patent showed conversion of methane to high purity hydrogen (H2 volume % purity was 99.86 and 99.70). The sulfur content of the hydrogen gas was not reported, but presumably trace amounts of $H_2S$ were present, at least during the early stages of the process as sulfur present in tile iron was removed by the refining effect of the hydrogen production. In this example, the sulfur was in the metal and no sulfur in the feed.

Some use has been made of molten metal baths to absorb $H_2S_x$ though the bath in question was not a molten iron bath and operated at a lower temperature than molten iron baths.

I did not like the conventional approach to dealing with feed sulphur. Now, refiners add large amounts of alkaline material to form an alkaline slag layer which has to be thick enough to react with sulphur compounds as they form or extract dissolved sulfur from the metal. The added alkaline material consumes significant amounts of energy when dumped into the reactor to form a slag layer. This slag layer in turn creates a removal problem and eventually a disposal problem.

I wanted to be able to deal with sulfur containing feeds without unnaturally altering the heat balance of the reactor by adding large amounts of alkaline material to deal with the feed sulfur. I discovered a way convert much, and potentially all, of the feed sulfur to $H_2S$. Such material, while highly toxic, is easily handled in any modern refinery using conventional amine scrubbing, Claus conversion and the like techniques. $H_2S$ is a dangerous material, but refiners have been efficiently converting it to elemental sulfur for over 50 years.

The solution was surprisingly simple. Change the operating conditions in the molten metal reactor so that strong reducing environment was created. Rather than do this adding hydrogen at ruinous expense, do it cheaply by letting the carbon level build up in the reactor. High dissolved carbon levels in a molten iron bath could be used to create conditions where most, or all, of the feed sulfur could be converted to $H_2S$.

BRIEF SUMMARY OF THE INVENTION

Accordingly, the present invention provides a process for producing $H_2S$ from a sulfur containing feed in a molten metal bath comprising dissolving at least 3 wt. % carbon in a molten metal bath comprising at least 50 wt. % Fe; charging a sulfur, hydrogen and carbon containing feed to such bath and thermally decomposing said feed to produce $H_2S$ and carbon, emitting the $H_2S$ as a vapor product from or above said molten metal bath and dissolving at least a portion of said carbon in said molten metal bath; and at least periodically adding oxygen or an oxygen containing gas to said molten metal bath to oxidize at least a portion of said dissolved carbon from said bath.

DETAILED DESCRIPTION DESCRIPTION OF THE PREFERRED EMBODIMENTS

Feed Materials

Any sulfur containing feed may be used, ranging from normally gaseous materials, such as sulfur containing natural gas streams to normally liquid and even solid materials. The invention is especially useful at converting heavy distillate, vacuum and other resids, solvent deasphalted pitch (SDA), aromatic extracts, FCC slurry oil and the like into useful products without hydrotreating. In addition, the invention can also efficiently process many sulfur containing solids such as trash, garbage, tires, coal, virtually any other sulfur-containing material.

If the sulfur containing feed does not contain enough hydrogen, then some hydrocarbon rich material can be added with the sulfur containing feed to provide sufficient hydrogen to thermally decompose the feed to a reduced form or sulfur rather than an oxidized form of sulfur.

Products $H_2S$ is the preferred product. Preferably most, for example, at least 80% and ideally essentially all, of the feed sulfur is converted to $H_2S$.

Other products of molten metal processing include CO, $CO_2$, $H_2$, perhaps some methane and even some soot. In my process, a little soot can be a good thing in that it ensures that the molten metal bath is saturated with carbon. The production of solid soot is not especially beneficial, and will require some sort of filter or bag house means to remove soot. Many units will have or can readily install such equipment anyway. For these units with a baghouse or electrostatic precipitator or the like filtering means to remove entrained solids, the presence of soot incurs no additional capital expense and provides an easy way to ensure a reducing "atmosphere" is always present in the molten metal

Controls

Conventional analog or digital controls may be used, measuring temperature, preferably with optical or infrared pyrometer or protected thermocouple; carbon by spectrometers; level by nuclear radiation and admitting feed, $CH_3$, $CO_2$, $H_2O$ to maintain temperature, which must be high enough (e.g., at least 1150° C. (2101° F.) to maintain the particular metal carbon composition liquid and dissolved carbon level and $H_2$ production within preset limits. Temperature of the molten metal is preferably 1150° to 1600° C. (2102° to 2912° F.), more preferably 2200° to 3000° F., even more preferably 1250° to 1500° C. (2282° to 2732° F.) during feed to the reactor or crucible and usually preferably 50° to 150° C. (122° to 302° F.) higher during the oxidation cycle within the single-chamber reactors or crucibles.

Reactor Design

The process does not require any special reactor design. Any molten metal reactor apparatus can be used. Many people will prefer to use reactors similar to those used in steel manufacturing, e.g. the design shown 4,574,714 or in U.S. Pat. No. 5,322,547 (but preferably without the slag layer).

I prefer to use a pressurized system, such as that shown in U.S. Pat. No. 5,435,814.

The hardware, per se, forms no part of the present invention.

Process Variables

Minimum dissolved carbon whenever the bed sees sulfur containing feed should be at least 2.0 wt. %, but preferably is higher e.g. 4.0 wt. %, 5.0 wt. %, or 6.0 wt. %

Control of dissolved carbon level and other conditions hi a molten metal reactor allows a majority of the sulfur content of the feed to be converted to $H_2S$, rather than sulfur oxides or required sulfur removal as slag. High dissolved carbon levels, preferably in excess of 3 wt. % in a molten metal iron bath, and limited oxygen addition, allow molten metal refiners to process sulfur containing feeds without addition of lime or other similar alkaline materials, permitting slag formation to be reduced or eliminated.

Modifications

Reference to documents made in the specification is intended to incorporate such patents or literature.

What is claimed is:

1. A process for producing $H_2S$ from a sulfur, hydrogen and carbon containing feed in a molten metal bath comprising:

a) forming a molten metal comprising at least 50 wt. % Fe;

b) charging, at least periodically, a sulfur, hydrogen and carbon containing feed to said bath;

c) thermally decomposing said sulfur, hydrogen and carbon containing feed to produce $H_2$, $H_2S$ and carbon;

d) recovering $H_2$ and $H_2S$ as a vapor product from or above said molten metal bath;

e) dissolving at least a portion of said carbon in said sulfur, hydrogen and carbon containing feed in said molten metal bath to form a molten metal bath containing at least 3 wt. % dissolved carbon;

f) at least periodically adding oxygen or an oxygen containing gas to said molten metal bath to oxidize a portion of dissolved carbon from said bath, while limiting oxidation so that said bath contains at least 3 wt. % carbon at all times; and g) repeating steps b-f to process additional amounts of said sulfur, hydrogen and carbon containing feed.

2. The process of claim 1 wherein the minimum carbon level in said molten metal bath is 4.0 wt. %.

3. The process of claim 1 wherein the minimum carbon level in said molten metal bath is 5.0 wt. %.

4. The process of claim 1 wherein the minimum carbon level in said molten metal bath is 6.0 wt. %.

5. The process of claim 1 wherein the molten metal bath is at least intermittently saturated with carbon and produces soot.

6. The process of claim 1 wherein said process occurs in a single molten metal bath, with sequential addition of oxygen.

7. The process of claim 1 wherein said molten metal bath is a circulating molten metal bath with at least two physically isolated vapor regions above said circulating molten metal bath, and wherein one of said vapor regions is a reducing region receiving said sulfur, hydrogen and carbon containing feed and the other said vapor region is an oxidizing region producing a carbon oxide flue gas above a portion of said circulating molten metal bath receiving said oxygen.

8. The process of claim 1 wherein the molten metal bath is essentially slag free.

9. The process of claim 1 wherein at least 80% of said feed sulfur is converted to $H_2S$.

10. The process of claim 1 wherein at least a portion, recovered as a vapor product, of hydrogen is recycled to said bath to enhance sulfur removal.

11. The process of claim 1 wherein the temperature of the molten metal bath ranges between 2200° and 3000° F.

* * * * *